INVENTORS
RAYMOND E. LAWRENCE
LAWRENCE R. WITHEROW

ATTORNEYS

INVENTORS
RAYMOND E. LAWRENCE
LAWRENCE R. WITHEROW

BY Robert W. Hampton

ATTORNEYS

INVENTORS
RAYMOND E. LAWRENCE
LAWRENCE R. WITHEROW

BY Robert W. Hampton

ATTORNEYS

United States Patent Office 3,429,042
Patented Feb. 25, 1969

3,429,042
DEVICE FOR OPENING PLASTIC
FILM CARTRIDGES
Raymond Edward Lawrence, Rochester, and Lawrence R.
Witherow, Avon, N.Y., assignors to Eastman Kodak
Company, Rochester, N.Y., a corporation of New
Jersey
Filed Feb. 23, 1966, Ser. No. 529,304
U.S. Cl. 30—11                                2 Claims
Int. Cl. B67b 7/30; B26d 1/28, 7/00

ABSTRACT OF THE DISCLOSURE

An opening device for a sealed cartridge containing a roll of film which cuts from a wall of the cartridge a circular section having a diameter slightly larger than the roll of film. The periphery of said circular section tapers inwardly, so that it will fall away from, but not into, the cartridge when it is completely cut from the wall thereof.

---

This invention relates to an opening device and more specifically to a device which is especially adapted to open plastic film cartridges.

Motion picture film cartridges currently in use have the supply and take-up reels disposed in a single sealed cartridge. A cartridge of this type is shown for example in copending application Ser. No. 334,207 filed Dec. 30, 1963, now Patent No. 3,208,686, and assigned to the present assignee. Such cartridges are sealed and when the film contained therein is exposed the cartridge must be opened to remove and develop the film. This invention provides a means for opening the cartridge quickly and without danger of injury to the film.

Heretofore cartridge openers generally included a hole saw or spinning cutter which cut through the plastic case and provided an opening of sufficient size to remove the exposed film. However, such devices generally produced bits of plastic which fell onto the exposed film and could scratch or otherwise damage the exposed film. Furthermore, such devices cut a section from the cartridge which frequently dropped inside the cartridge thereby rendering it difficult to remove the exposed film.

According to the present invention, all of the aforementioned difficulties are overcome and an opener is provided which permits exposed film to be readily removed from a cartridge without danger of injury to the film. With the cartridge opening device presently disclosed there are no bits of plastic produced by the cutter and there is no possibility of the section cut from the cartridge falling within the cartridge. These objectives are achieved by providing an opener which includes a single cutter blade which is mounted to be moved in a circular path of a diameter slightly greater than the diameter of the film reel to be removed from the cartridge. The cutter blade is mounted so as to extend angularly inwardly towards the axis of rotation of the cutter. Thus, the circular section cut from a cartridge has a larger outer diameter than the inner diameter thereof so that the section cannot fall within the cartridge from which it is cut.

An object of the present invention is to provide a device for opening film cartridges readily and without danger of injury to the film contained therein.

Another object of this invention is to provide an opening device for plastic film cartridges which cuts a circular section from the cartridge having a larger outside diameter than inside diameter and which when cutting produces a minimum of plastic chips.

Figure 1:
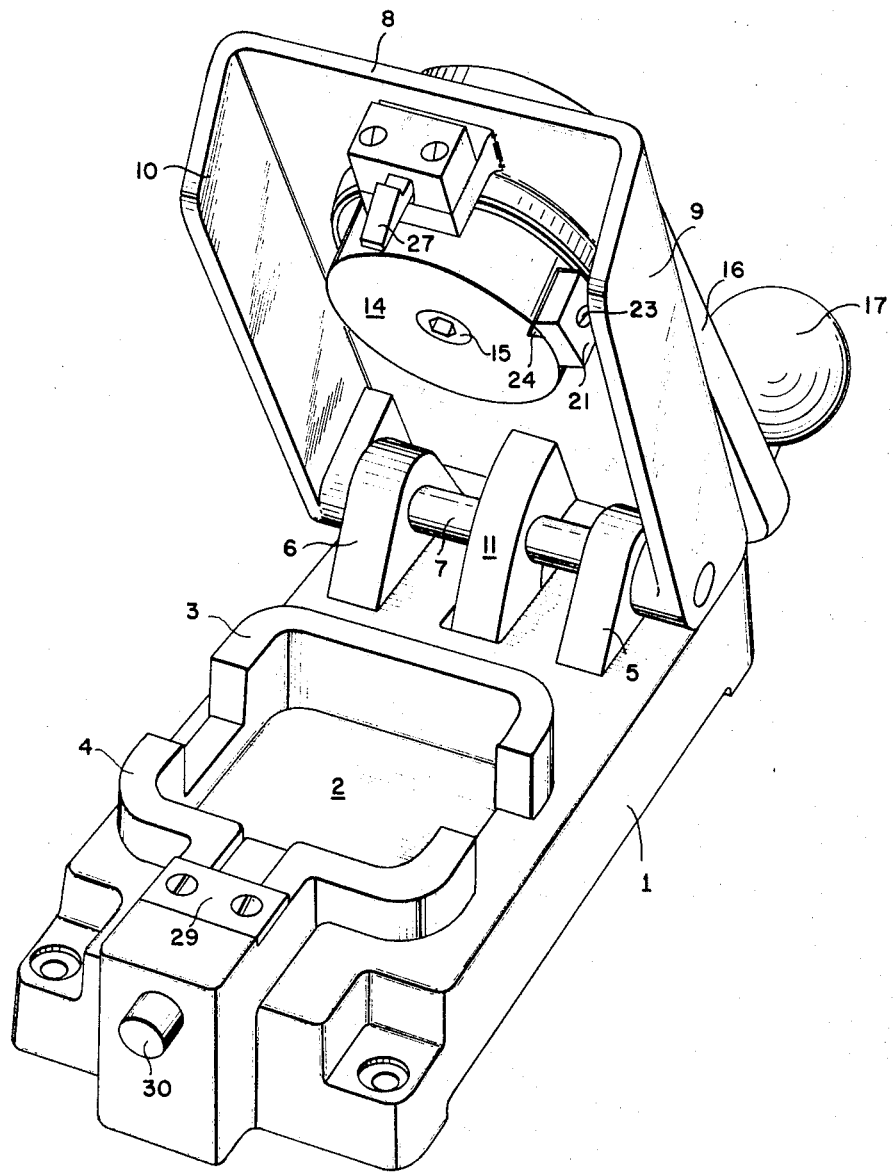
Figure 2:
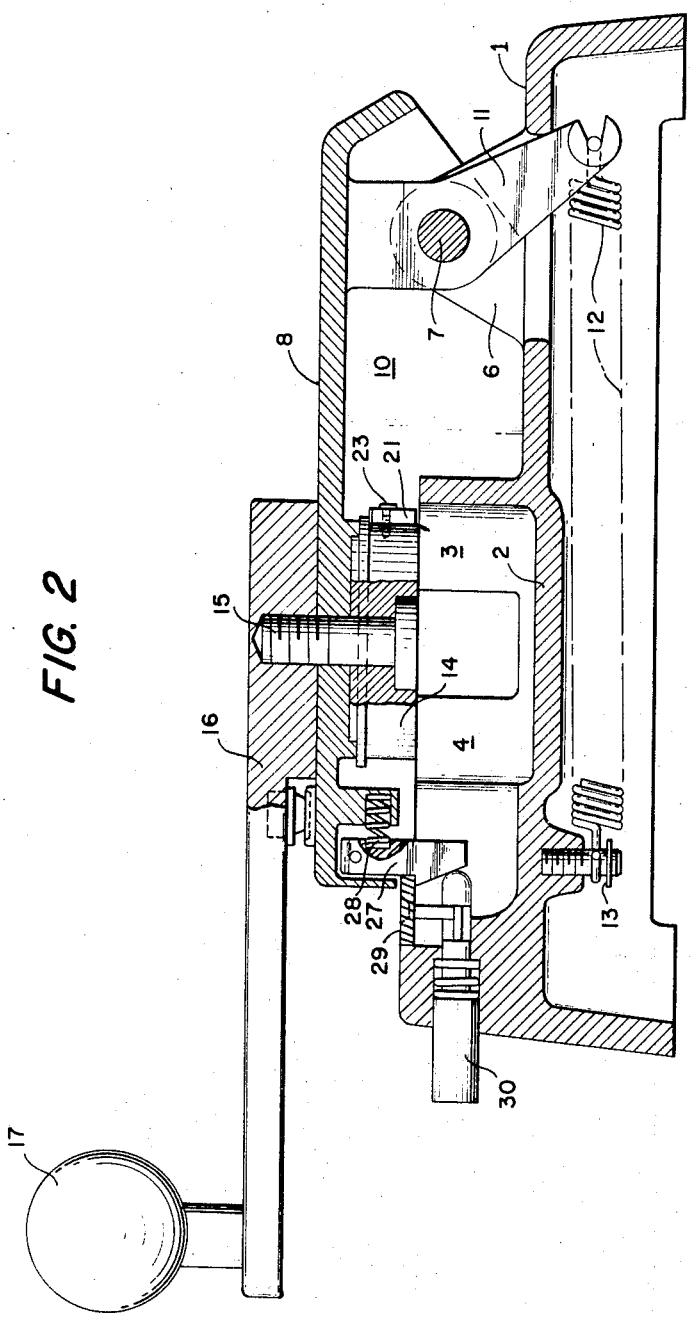
Figure 3:
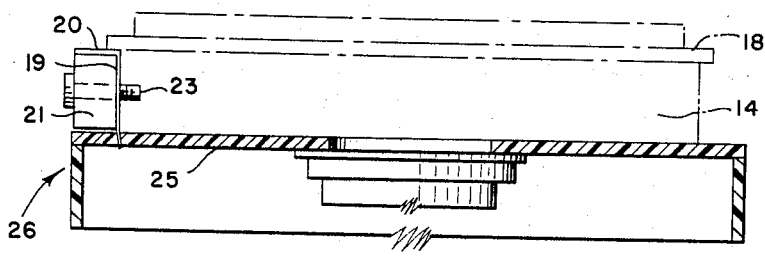
Figure 4:
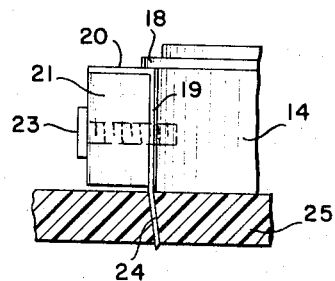
Figure 5:
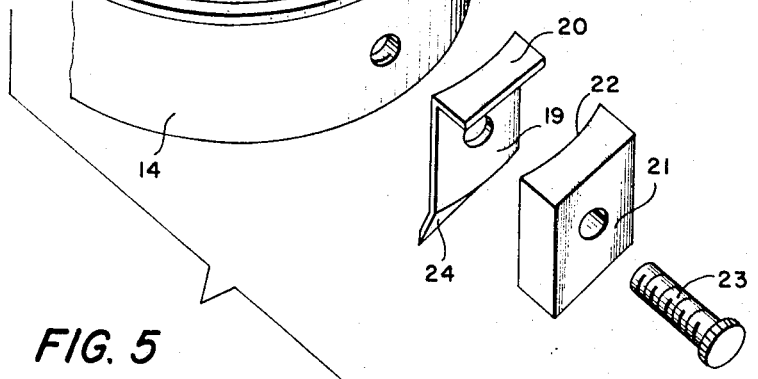

Other objects and many of the attendant advantages of the present invention will become more readily apparent upon consideration of the following detailed disclosure in connection with the accompanying drawings wherein:

FIGURE 1 is a perspective view of the opening device according to this invention with the cutting means in inoperative position, FIGURE 2 is a sectional elevational view with the cutting means in operative position, FIGURE 3 is a partial sectional view showing the cutting blade piercing a film cartridge, FIGURE 4 is an enlarged view of a portion of FIGURE 3, and FIGURE 5 is an exploded view showing the attachment of the cutting blade to the cutting head.

Referring now more specifically to the drawings wherein like numerals indicate like parts throughout the several views, there is shown at 1 in FIGURE 1, a frame which may be made of cast iron or other relatively heavy material to provide a firm supporting base for the opener. The frame 1 has a central recess 2 formed therein, this recess being of a size to receive a plastic film cartridge. Flanges 3 and 4 extend upwardly around the side of the recess 2 to engage and retain the peripheral edges of the film cartridge. There is provided a pair of upstanding bosses 5 and 6 having apertures therein to receive a rod 7 which provides a pivotal mounting for the top plate or cover 8.

The top plate or cover has downwardly extending lateral flange portions 9 and 10 within which the rod 7 is journalled and there is provided a bracket member 11 extending downwardly from the rear edge of the plate 8 through an aperture in the member 1. With reference to FIGURE 2 it can be seen that the lower end of the bracket 11 has one end of a spring 12 secured thereto, the other end of the spring 12 being secured to a pin 13 mounted in the frame 1. The spring 12 urges the top plate 8 to the open or inoperative position shown in FIGURE 1.

Rotatably mounted on the inner face of the top plate 8 is a circular member or cutting head 14. Member 14 is mounted on the top plate by means of a bolt 15 which extends through the top plate and is secured within a crank arm 16 mounted on the upper face of the top plate. Arm 16 has a hand engaging knob 17 on the outer end thereof and as the arm 16 is rotated the cutting head 14 is also rotated.

The cutting head 14 is provided with an outwardly extending flange 18 adjacent the upper peripheral edge of the cutting head. This structure is more clearly seen in FIGURES 3 to 5. There is provided a cutting blade 19 which is curved to conform to the outer periphery of the cutting head 14. The upper edge 20 of the cutting blade is bent outwardly and is adapted to fit beneath the flange 18 on the cutting head with the upper surface of portion 20 in contact with the undersurface of flange 18. The cutting blade 19 is retained in engagement with the periphery of the cutting head 14 by means of a retaining block 21 having the inner surface 22 curved to conform with the curvature of the cutting blade 19 and the peripheral surface of the head 14. A bolt 23 extends through apertures in retaining block 21, cutting blade 19 and into threaded bore within the head 14. It can be seen that when the cutting blade is so mounted on the head it is firmly gripped between the head and the retaining block and cannot rotate on the bolt 23 by reason of the engagement of portion 20 with the flange 18.

The cutting edge 24 of the blade 19 extends below the lower peripheral edge of head 14 as clearly shown in FIGURES 3 to 5. The cutting portion 24 of the blade extends angularly inwardly towards the center of the cutting head 14. In FIGURES 3 and 4 the blade is shown in a position piercing the upper wall 25 of a film cartridge 26. The cutting portion 24 of the blade 19 extends through the wall 25 and extends approximately .01″ beyond the inner surface of the cartridge casing wall.

There is provided latch means for retaining the top cover or plate 8 in engagement with the frame 1 and this latch means includes a pivoted latch element 27 (FIGURE 2) mounted in the cover plate 8 and urged outwardly by a spring 28. The latch engages the underface of a retaining member 29 secured to the frame 1. A release button 30 is adapted to be depressed to pivot the latch member 27 inwardly against the force of spring 28 to release the latch member from engagement with plate 29. Element 30 is spring urged to an inoperative position.

With the opening device in the position shown in FIGURE 1 a film cartridge which is to be opened is placed within the recess of frame 1 with the side of the cartridge containing the exposed film on the upper side. The top cover 8 is brought downwardly until the latch element 27 engages the retaining plate 29. In this position the cutting edge 24 of blade 19 pierces the upper surface of the film cartridge and the handle 17 is engaged to rotate the crank arm 16 through 360° so that the cutting blade moves through 360° to cut a circular section in the film cartridge casing. Due to the angular disposition of the cutting edge 24 the upper surface of the circular section cut from the film cartridge will have a larger diameter than the inner surface. Since the film cartridge casing is of substantial thickness, the circular section having a larger outer diameter than inner diameter cannot fall within the casing. When the release button 30 is depressed to release the latch 27 from engagement with the retaining plate 29 the cover is opened, the film cartridge is then removed. When the cartridge is turned over the circular section falls out and since the circular section cut from the casing has a diameter slightly greater than the diameter of the film reel contained within the cartridge, the film reel is also readily removed.

As the cutting blade makes but a single rotation in opening the film cartridges there is a minimum production of plastic chips which could cause injury to the exposed film. Obviously, if desired, the cutting blade could be power driven and the device could be provided with means for gripping the film cartridge within the recess 2 and the opening device inverted so that the circular section and exposed film would drop out of the cartridge when the top plate is opened.

Obviously, many modifications and variations of the present invention are possible in light of the above teachings. What is claimed as new and is desired to be secured by Letters Patent is:

1. An opening device for removing a film reel from a sealed cartridge comprising a frame, a recess in said frame for receiving a film cartridge, a cover pivotally mounted on said frame, a circular head rotatably mounted in said cover, an outwardly extending flange on the upper edge of said head, a curved blade engaging a portion of the outer periphery of the head, an outwardly extending portion on the upper edge of said blade, said outwardly extending portion on the blade disposed in abutting relation with the underside of the flange on said head, a retaining block securing the blade against said head, means mounted on the cover for rotating the head and blade, a cutting portion of said blade extending beyond the lower surface of said head, the cutting portion of said blade extending angularly inwardly towards the axis of rotation of said head, and means for latching said cover in engagement with the frame whereby when a film cartridge is disposed within the recess in the frame the cutting portion of said blade pierces the cartridge and when the head is rotated through 360° a circular section is cut from the cartridge having a diameter greater than the diameter of the film reel disposed within the cartridge and the circular section having a diameter at the outer face thereof greater than the diameter at the inner face thereof.

2. An opening device for removing a roll of film from a sealed cartridge and comprising:
    (1) a frame provided with a recess for receiving a film cartridge,
    (2) a cover pivotally mounted on said frame to move between an inoperative position, wherein it uncovers said recess to permit a cartridge to be inserted into and removed therefrom, and an operative position, wherein it covers said recess,
    (3) a blade support rotatably mounted on the underside of said cover and being rotatable about an axis extending perpendicular to the plane of said cover and arranged to be located substantially in the center of said recess when the cover is in its operative position,
    (4) means for fixing a blade to said blade support at a point spaced from the axis of rotation of said blade support, a cutting portion of said blade extending downwardly from said support and angularly inwardly towards the axis of rotation of said support, and
    (5) means for latching said cover in engagement with the frame when it is moved to its operative position, whereby when a film cartridge is disposed within the recess in the frame the cutting portion of said blade pierces the cartridge and when the blade support is rotated through 360° a circular section is cut from the cartridge having a diameter greater than the diameter of the roll of film disposed within the cartridge and the circular section having a diameter at the outer face thereof greater than the diameter at the inner face thereof.

References Cited

UNITED STATES PATENTS

| 459,224 | 9/1891 | De Lang | 30—11 |
| 1,145,343 | 7/1915 | Workman | 30—11 |
| 1,618,457 | 2/1927 | McGrath | 30—11 X |
| 1,689,301 | 10/1928 | Ryckman | 30—11 |
| 2,573,462 | 10/1951 | Lindsey | 30—300 X |

FOREIGN PATENTS

| 118,605 | 3/1901 | Germany. |

ANDREW R. JUHASZ, *Primary Examiner.*

G. WEIDENFELD, *Assistant Examiner.*

U.S. Cl. X.R.

30—310